(12) United States Patent
Chan et al.

(10) Patent No.: US 10,796,157 B2
(45) Date of Patent: Oct. 6, 2020

(54) HIERARCHICAL OBJECT DETECTION AND SELECTION

(71) Applicant: MediaTek Inc., Hsinchu (TW)

(72) Inventors: Tsun-Shan Chan, Hsinchu (TW); Shao-Nung Chiu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 143 days.

(21) Appl. No.: 15/920,369

(22) Filed: Mar. 13, 2018

(65) Prior Publication Data
US 2019/0286912 A1    Sep. 19, 2019

(51) Int. Cl.
| G06K 9/00 | (2006.01) |
| G06K 9/20 | (2006.01) |
| H04N 21/4722 | (2011.01) |
| H04N 5/45 | (2011.01) |
| H04N 21/4728 | (2011.01) |
| H04N 21/472 | (2011.01) |

(52) U.S. Cl.
CPC ....... *G06K 9/00744* (2013.01); *G06K 9/2081* (2013.01); *H04N 5/45* (2013.01); *H04N 21/4722* (2013.01); *H04N 21/4728* (2013.01); *H04N 21/47217* (2013.01)

(58) Field of Classification Search
CPC .. G06K 9/00744; G06K 9/2081; G06K 9/468; G06K 9/6255; G06K 9/00671; G06F 12/08; G06T 7/10; G06T 7/70
See application file for complete search history.

(56) References Cited

U.S. PATENT DOCUMENTS

| 7,142,434 B2 * | 11/2006 | Beihoff | H02M 1/44 361/818 |
| 7,239,929 B2 * | 7/2007 | Ulrich | G06K 9/468 345/420 |
| 8,363,939 B1 * | 1/2013 | Khosla | G06K 9/4623 382/164 |

(Continued)

FOREIGN PATENT DOCUMENTS

| CN | 1359500 A | 7/2002 |
| CN | 102106145 A | 6/2011 |

(Continued)

OTHER PUBLICATIONS

Taiwan Intellectual Property Office, Office Action for Taiwan Patent Application No. 107144761, May 23, 2019.

*Primary Examiner* — David E Harvey
(74) *Attorney, Agent, or Firm* — Han IP PLLC; Andy M. Han

(57) ABSTRACT

A processor of an apparatus plays a video on a display device and receives a command one or more times. In response to receiving the command, the processor performs object detection in a hierarchical manner with respect to objects in the video. The processor displays a video image from the video. Upon receiving the command for a first time, the processor detects in the video image a first set of one or more objects at a first hierarchical level and highlights the first set of one or more objects. Upon receiving the command for a second time, the processor detects in the video image a second set of one or more objects at a second hierarchical level below the first hierarchical level and highlights the second set of one or more objects.

16 Claims, 5 Drawing Sheets

(56) References Cited

U.S. PATENT DOCUMENTS

| | | | |
|---|---|---|---|
| 8,515,160 B1* | 8/2013 | Khosla | G06K 9/4623 382/156 |
| 9,466,009 B2* | 10/2016 | Jaber | G06K 9/52 |
| 9,505,494 B1* | 11/2016 | Marlow | B64C 39/024 |
| 9,798,949 B1* | 10/2017 | Du | G06K 9/46 |
| 10,366,144 B2* | 7/2019 | Chellam | G06Q 30/0601 |
| 2005/0129311 A1* | 6/2005 | Haynes | G06K 9/00248 382/170 |
| 2007/0293997 A1* | 12/2007 | Couch | G01M 17/00 701/31.4 |
| 2008/0304740 A1* | 12/2008 | Sun | G06K 9/3233 382/168 |
| 2009/0161912 A1* | 6/2009 | Yatom | G06K 9/00228 382/103 |
| 2010/0080470 A1* | 4/2010 | Deluca | G06K 9/00664 382/209 |
| 2010/0171764 A1* | 7/2010 | Feng | G06K 9/3233 345/660 |
| 2010/0284568 A1* | 11/2010 | Tojo | G06K 9/00255 382/103 |
| 2011/0044545 A1* | 2/2011 | Jessen | G06K 9/6203 382/190 |
| 2012/0045095 A1* | 2/2012 | Tate | G06T 5/003 382/103 |
| 2012/0121187 A1* | 5/2012 | Lee | G06F 16/583 382/195 |
| 2012/0227074 A1* | 9/2012 | Hill | H04N 21/42224 725/61 |
| 2013/0263180 A1 | 10/2013 | Yang et al. | |
| 2014/0164921 A1* | 6/2014 | Salinas | G06F 3/011 715/716 |
| 2014/0211002 A1* | 7/2014 | Lin | H04N 7/181 348/143 |
| 2014/0270490 A1* | 9/2014 | Wus | G06K 9/00234 382/159 |
| 2014/0348434 A1* | 11/2014 | Xu | G06K 9/0055 382/228 |
| 2015/0130740 A1* | 5/2015 | Cederlund | G06F 3/014 345/173 |
| 2015/0135128 A1* | 5/2015 | Ren | G06F 3/04815 715/781 |
| 2015/0138211 A1* | 5/2015 | Ren | G06T 17/005 345/520 |
| 2015/0146925 A1* | 5/2015 | Son | G06K 9/00624 382/103 |
| 2015/0375117 A1* | 12/2015 | Thompson | A63F 13/35 463/9 |
| 2016/0117798 A1* | 4/2016 | Lin | G06T 3/40 345/667 |
| 2016/0232777 A1* | 8/2016 | Jedwab | G08B 25/001 |
| 2017/0054982 A1* | 2/2017 | Vellore Arumugam | H04N 19/132 |
| 2017/0337693 A1* | 11/2017 | Baruch | G06T 7/168 |
| 2018/0025392 A1* | 1/2018 | Helstab | G06Q 30/0278 705/306 |
| 2018/0197040 A1* | 7/2018 | Krishnamurthi | G06K 9/4671 |
| 2018/0204111 A1* | 7/2018 | Zadeh | G06K 9/00281 |
| 2018/0218505 A1* | 8/2018 | Kim | G06T 7/251 |
| 2018/0336666 A1* | 11/2018 | Kim | G06T 5/005 |
| 2019/0005344 A1* | 1/2019 | Tanabe | G06K 9/3241 |
| 2019/0012836 A1* | 1/2019 | Lim | G06T 19/006 |
| 2019/0019045 A1* | 1/2019 | Ogura | G06T 7/74 |
| 2019/0034759 A1* | 1/2019 | Barnett | G06K 9/6215 |
| 2019/0095467 A1* | 3/2019 | Kislyuk | G06F 16/5838 |
| 2019/0102752 A1* | 4/2019 | Valenti | G06Q 10/20 |
| 2020/0034958 A1* | 1/2020 | Campbell | G06T 7/0002 |
| 2020/0089962 A1* | 3/2020 | Narang | G06K 9/6267 |

FOREIGN PATENT DOCUMENTS

| | | |
|---|---|---|
| CN | 104767911 A | 7/2015 |
| JP | 6270578 B2 * | 1/2018 |
| TW | 201733373 A | 9/2017 |

* cited by examiner

HIERARCHICAL OBJECT DETECTION AND SELECTION

TECHNICAL FIELD

The present disclosure is generally related to object detection and selection in images. In particular, the present disclosure is related to a hierarchical approach to detection and selection of objects in an image.

BACKGROUND

Unless otherwise indicated herein, approaches described in this section are not prior art to the claims listed below and are not admitted as prior art by inclusion in this section.

In a digital image, which may be displayed on a display device for viewing by a user, artificial intelligence (AI) algorithms can be utilized to detect objects in the image as well as to display a frame or box around each detected object to highlight each detected object. However, when there is a large variety of different kinds of objects and/or a large number of objects in an image, the amount of computational time and power required for the AI algorithms to perform object detection on all the objects in the image can be excessive. Moreover, it is often unnecessary to have all the objects in the image detected and highlighted, since the user might be interested in only one or few of the highlighted objects in the image. Besides, with a large number of objects highlighted with frames or boxes surrounding the detected objects, it can be difficult and time-consuming for the user to view the objects in the image to find and see the one or few object(s) of interest.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

The present disclosure provides schemes, techniques, methods and systems pertaining to a hierarchical approach to detection and selection of objects in images. Under a proposed scheme of the present disclosure, a user may select, from a number of highlighted objects in an image, one or more objects of interest for further processing (e.g., identification, retrieval and display of pertinent information, rendering of a purchase transaction, executing a task, and so on). Moreover, under the proposed scheme, a user may zoom in and out of a field of interest, which may contain a number of highlighted objects, to gradually detect more details of the objects until the user finds an object of interest.

In one aspect, a method may involve a processor of an apparatus playing a video on a display device. The method may also involve the processor receiving a command one or more times. The method may further involve the processor performing object detection in a hierarchical manner with respect to a plurality of objects in the video responsive to receiving the command one or more times. Specifically, the method may involve the processor displaying, on the display device, a video image from the video. Upon receiving the command for an $N^{th}$ time, the method may involve the processor detecting in the video image a first set of one or more objects of the plurality of objects at a first hierarchical level and highlighting, on the display device, the first set of one or more objects. N may be a positive integer equal to or greater than 1. Upon receiving the command for an $(N+1)^{th}$ time, the method may involve the processor detecting in the video image a second set of one or more objects of the plurality of objects at a second hierarchical level below the first hierarchical level and highlighting, on the display device, the second set of one or more objects. Each object of the second set of one or more objects may be a part of a respective object of the first set of one or more objects.

In one aspect, an apparatus may include a display device and a processor communicatively coupled to the display device. The processor may be capable of playing a video on the display device, receiving a command one or more times, and performing object detection in a hierarchical manner with respect to a plurality of objects in the video responsive to receiving the command one or more times. Specifically, the processor may display, on the display device, a video image from the video. Upon receiving the command for an $N^{th}$ time, the processor may detect in the video image a first set of one or more objects of the plurality of objects at a first hierarchical level and highlight, on the display device, the first set of one or more objects. N may be a positive integer equal to or greater than 1. Upon receiving the command for an $(N+1)^{th}$ time, the processor may detect in the video image a second set of one or more objects of the plurality of objects at a second hierarchical level below the first hierarchical level and highlight, on the display device, the second set of one or more objects. Each object of the second set of one or more objects may be a part of a respective object of the first set of one or more objects.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Overview

Figure 1:
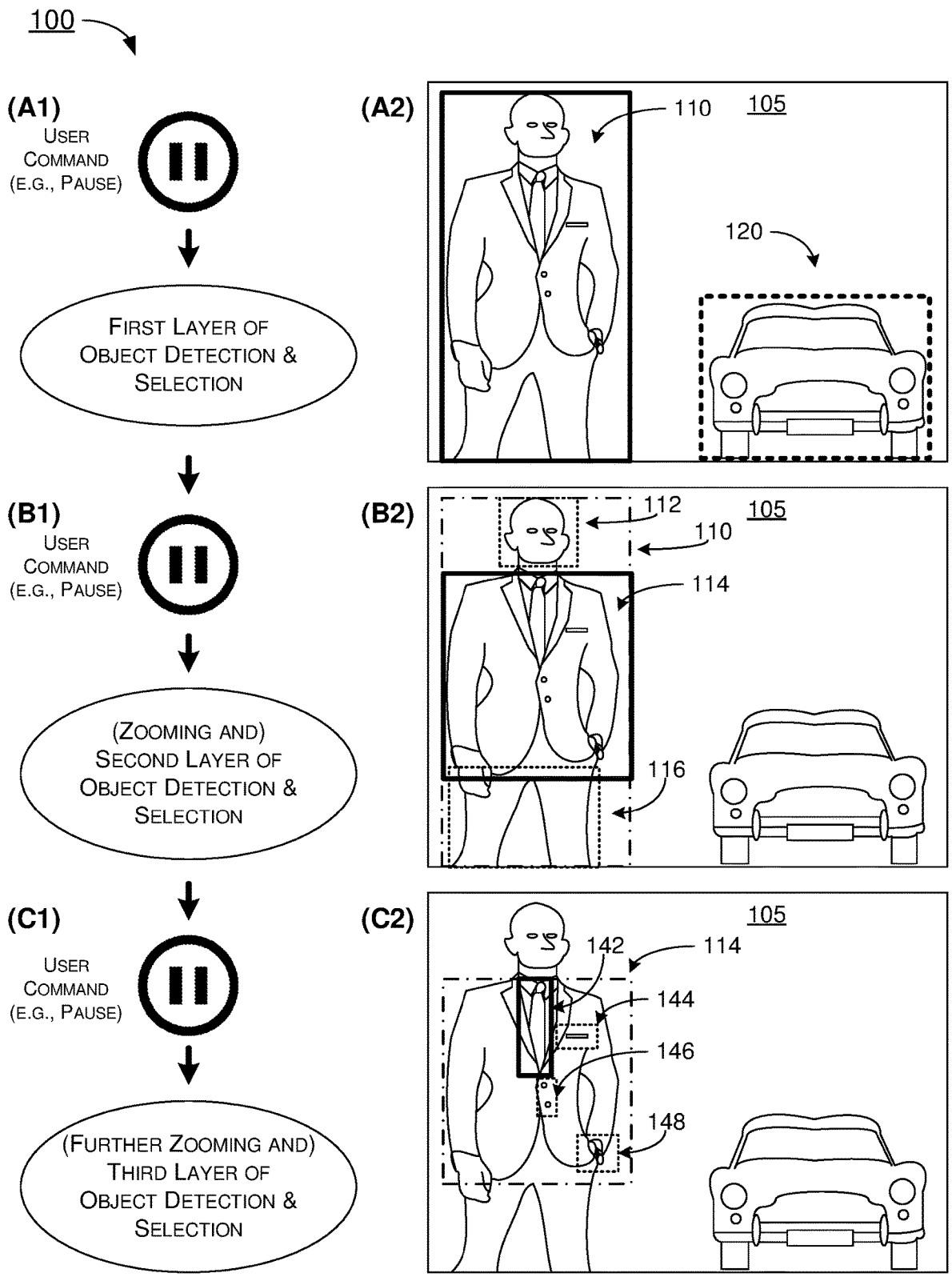
FIG. 1 is a diagram of an example scenario in accordance with an implementation of the present disclosure.

FIG. 1 illustrates an example scenario 100 in accordance with an implementation of the present disclosure. Scenario 100 may pertain to hierarchical object detection of objects in a video in accordance with the present disclosure. Scenario 100 may be implemented on a video being played on a display device.

Referring to part (A1) of FIG. 1, while the video is being played on the display device, a user command (e.g., due to a "pause" button on a remote control or an icon representing a "pause" button on a touch panel of a smartphone or display device being pressed by a user) may be received (e.g., by a processor of an apparatus such as an intelligent display or intelligent television (TV)) for a first time. That is, the user command may be entered by the user via a remote control. Alternatively, the user command may be entered by the user via a smartphone or a touch panel of the display device on which video image 105 is displayed. Still alternatively, the user command may be a gesture control entered by the user using a gesture. The gesture may be a touchless gesture (e.g., an air gesture such as a movement of a finger, a hand or eyes of the user in the air) or a touch-sensing gesture (e.g., a gesture involving the touching and/or movement on a touch-sensing screen), and a pattern of the gesture (e.g., movement of a path of the finger, hand or eyes of the user) may match a pre-defined pattern corresponding to the user command (e.g., "pause"). Upon receiving the user command, the playing of the video on the display device may be paused and hierarchical object detection may be performed. Referring to part (A2) of FIG. 1, in this example a video image 105 of the paused video shows a person 110 and a car 120. Thus, at a first level of hierarchical object detection, person 110 and car 120 may be detected as two top-level or first-level objects in video image 105. Moreover, each of person 110 and car 120 in video image 105 may be highlighted in a respective fashion. For instance, person 110 may be highlighted with a first frame or box encircling person 110, and car 120 may be highlighted with a second frame or box encircling car 120. First frame or box may be displayed in a first color, style (e.g., thick line or thin line, solid line or dashed line) and/or brightness, and second frame or box may be displayed in a second color, style and/or brightness different from that of first frame or box. In the example shown in part (A2) of FIG. 1, person 110 is highlighted by a box of thick and solid lines encircling person 110, and car 120 is highlighted by a box of thick and dotted lines encircling car 120.

Furthermore, one of the detected/highlighted objects may be chosen randomly (e.g., by AI algorithms) as a selected object by default. In scenario 100, the object that is currently selected, whether by default or by the user, is highlighted by a box of thick and solid lines encircling the selected object. In this example, at the first level of hierarchical object detection, person 110 may be the selected object by default. Accordingly, person 110 is highlighted by a box of thick and solid lines encircling person 110, as shown in part (A2) of FIG. 1. As an option, instead of pausing the video and displaying video image 105 on the display device, the video may continue to be played on the display device while video image 105 may be shown as a picture-in-picture (PIP) in a portion of the display device. For instance, upon receiving the user command (e.g., "pause"), the video may continue to be played on the display device while video image 105 (which may be a video image from the video being displayed on the display device at the time the user command is received) may be displayed near a corner of the display device (e.g., upper-right corner, upper-left corner, lower-left corner, or lower-right corner) so as not to obscure viewing of the video.

Referring to part (B1) of FIG. 1, the same user command (e.g., "pause") may be received for a second time, as an indication that none of the currently detected/highlighted objects is an object of interest (hereinafter interchangeably referred as a "target object") for the user. Upon receiving the user command for the second time, a second level of hierarchical object detection may be performed. As person 110 is the selected object by default and the user did not change the selection from person 110 to car 120, the second level of hierarchical object detection may be performed on person 110 and not car 120. Referring to part (B2) of FIG. 1, head 112, upper body 114 and lower body 116 of person 110 may be detected as three second-level objects in video image 105. Moreover, each of head 112, upper body 114 and lower body 116 in video image 105 may be highlighted in a respective fashion. For instance, upper body 114 may be highlighted with a third frame or box encircling upper body 114, head 112 may be highlighted with a fourth frame or box encircling head 112, and lower body 116 may be highlighted with a fifth frame or box encircling lower body 116. Third frame or box may be displayed in a third color, style and/or brightness, and each of fourth and fifth frames or boxes may be displayed in a fourth color, style and/or brightness different from that of third frame or box. In the example shown in part (B2) of FIG. 1, upper body 114 is the selected object by default and is highlighted by a box of thick and solid lines encircling upper body 114. Additionally, each of head 112 and lower body 116 is highlighted by a box of thin and dotted lines encircling each of head 112 and lower body 116.

As an option, since head 112, upper body 114 and lower body 116 are objects within person 110, person 110 may also be highlighted with a respective frame or box that is displayed in a different color, style and/or brightness. As another option, instead of displaying the same video image 105 on the display device, an enlarged and zoomed-in partial view of video image 105 (e.g., centering the selected object, which is person 110 in this example) may be displayed as a different video image (not shown).

Referring to part (C1) of FIG. 1, the same user command (e.g., "pause") may be received for a third time, as an indication that none of the currently detected/highlighted objects is an object of interest (target object) for the user. Upon receiving the user command for the third time, a third level of hierarchical object detection may be performed. As upper body 114 of person 110 is the selected object by default and the user did not change the selection from upper body 114 to either head 112 or lower body 116, the third level of hierarchical object detection may be performed on upper body 114 and not head 112 or lower body 116. Referring to part (C2) of FIG. 1, necktie 142, handkerchief 144, buttons 146 and wrist watch 148 of upper body 114 may be detected as four third-level objects in video image 105. Moreover, each of necktie 142, handkerchief 144, buttons 146 and wrist watch 148 in video image 105 may be highlighted in a respective fashion. For instance, necktie 142 may be highlighted with a sixth frame or box encircling upper body necktie 142, handkerchief 144 may be highlighted with a seventh frame or box encircling handkerchief 144, buttons 146 may be highlighted with an eighth frame or box encircling buttons 146, and wrist watch 148 may be highlighted with a ninth frame or box encircling wrist watch 148. Sixth frame or box may be displayed in a fifth color, style and/or brightness, and each of seventh, eighth and ninth frames or boxes may be displayed in a sixth color, style and/or brightness different from that of fifth frame or box. In the example shown in part (C2) of FIG. 1, necktie 142 is the selected object by default and is highlighted by a box of thick and solid lines encircling necktie 142. Additionally, each of handkerchief 144, buttons 146 and wrist watch 148 is highlighted by a box of thin and dotted lines encircling each of handkerchief 144, buttons 146 and wrist watch 148.

As an option, since necktie 142, handkerchief 144, buttons 146 and wrist watch 148 are objects within upper body 114 of person 110, upper body 114 may also be highlighted with a respective frame or box that is displayed in a different color, style and/or brightness. As another option, instead of displaying the same video image 105 on the display device, an enlarged and zoomed-in partial view of video image 105 (e.g., centering the selected object, which is upper body 114 in this example) may be displayed as a different video image (not shown).

Thus, under the proposed scheme and as shown in FIG. 1 with respect to scenario 100, further hierarchical object detection (from an upper level to a lower level in terms of granularity and/or details) may be performed on a currently selected object but not on other non-selected object(s), thereby avoiding unnecessary computational time and power. The user may utilize or otherwise enter the same command (e.g., "pause") to move from an upper level to a lower level for hierarchical object detection. Thus, the depth of hierarchical object detection, in a descending order from a top level downward, depends on the number of times such user command is entered and received. At each level of hierarchical object detection, each discernible object within the context at the respective level may be identified or otherwise detected and then highlighted. Moreover, the detected objects at a lower level may be parts of a single object of an upper level. For instance, in scenario 100, at a top level or first level of hierarchical object detection, the context is the entire scene shown in video image 105, and thus the discernible objects at that level include person 110 and car 120. Then, at a lower level or second level of hierarchical object detection, the context is person 110, and thus the discernible objects at that level include head 112, upper body 114 and lower body 116. Next, at a next lower level or third level, the context is upper body 114, and thus the discernible objects at that level include necktie 142, handkerchief 144, buttons 146 and wrist watch 148.

Figure 2:
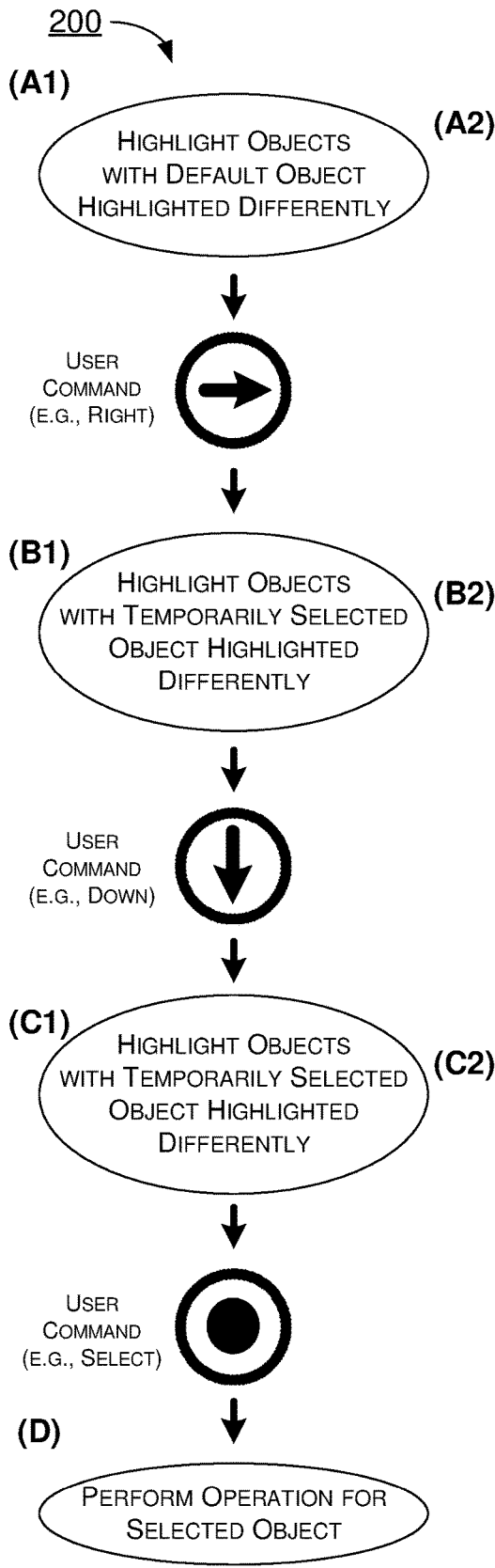
FIG. 2 is a diagram of an example scenario in accordance with an implementation of the present disclosure.
Figure 2:
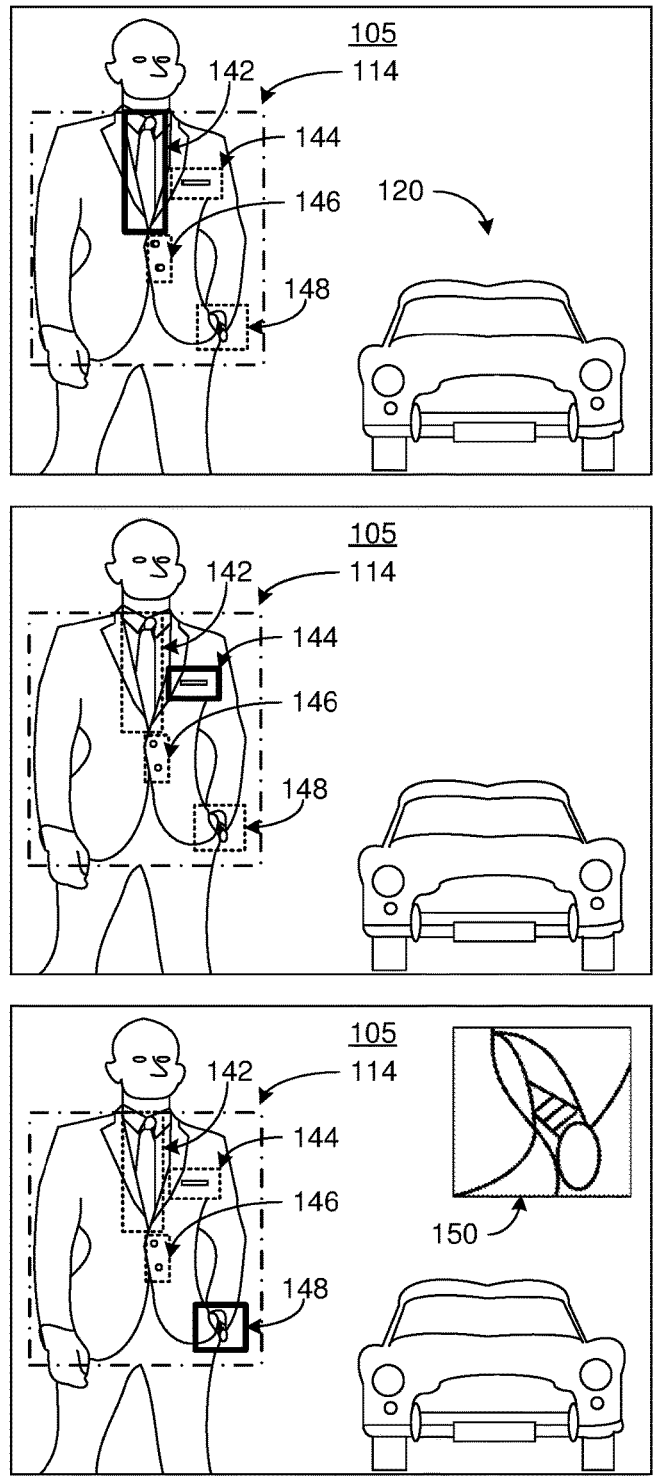

FIG. 2 illustrates an example scenario 200 in accordance with an implementation of the present disclosure. Scenario 200 may pertain to selection of objects in a video image of a video following hierarchical object detection in accordance with the present disclosure. Scenario 200 may be implemented on a video being played on a display device. In the example shown in FIG. 2, scenario 200 is a continuation of scenario 100.

Referring to parts (A1) and (A2) of FIG. 2, in the beginning of scenario 200, necktie 142 is the selected object by default (e.g., chosen randomly by AI algorithms) and thus necktie 142 is highlighted differently from other detected/highlighted objects at the current level, including handkerchief 144, buttons 146 and wrist watch 148. A different user command (e.g., "move left", "move right", "move up" or "move down") may be received as an indication that the user intends to select one of the detected/highlighted objects other than necktie 142. The user command may be entered by the user via a remote control. Alternatively, the user command may be entered by the user via a smartphone or a touch panel of the display device on which video image 105 is displayed. Still alternatively, the user command may be a gesture control entered by the user using a gesture. The gesture may be a touchless gesture (e.g., an air gesture such as a movement of a finger, a hand or eyes of the user in the air) or a touch-sensing gesture (e.g., a gesture involving the touching and/or movement on a touch-sensing screen), and a pattern of the gesture (e.g., movement of a path of the finger, hand or eyes of the user) may match a pre-defined pattern corresponding to the user command (e.g., "move left", "move right", "move up" or "move down"). As shown in part (A1) of FIG. 2, a user command to move the selection to the right is received.

Referring to parts (B1) and (B2) of FIG. 2, as a "move right" command was received, the selected object is changed from necktie 142 to handkerchief 144 since handkerchief 144 is to the right of necktie 142 among the detected/highlighted objects at this level as shown in video image 105. Accordingly, handkerchief 144 becomes the selected object as a result of the user command and thus handkerchief 144 is highlighted differently from other detected/highlighted objects at the current level, including necktie 142, buttons 146 and wrist watch 148. Then, yet another user command may be received as an indication that the user intends to select one of the detected/highlighted objects other than handkerchief 144. As shown in part (B1) of FIG. 2, a user command to move the selection downward is received.

Referring to parts (C1) and (C2) of FIG. 2, as a "move down" command was received, the selected object is changed from handkerchief 144 to wrist watch 148 since wrist watch 148 is below handkerchief 144 among the detected/highlighted objects at this level as shown in video image 105. Accordingly, wrist watch 148 becomes the selected object as a result of the user command and thus wrist watch 148 is highlighted differently from other detected/highlighted objects at the current level, including necktie 142, handkerchief 144 and buttons 146. Then, as shown in part (C1) of FIG. 2, a different user command (e.g., "select") may be received as an indication that the user intends to select the currently selected object (i.e., wrist watch 148). As an option, an enlarged and zoomed-in partial view of the user-selected object may be displayed on the display device (not shown) or as a PIP 150 in a portion of video image 105 as shown in part (C2) of FIG. 2.

Referring to part (D) of FIG. 2, as the user has selected wrist watch 148, one or more operations may be performed with respect to wrist watch 148. For instance, information related to wrist watch 148 (e.g., brand, model, price and seller(s)) may be searched up or otherwise obtained, and the information may be displayed on the display device (e.g., shown on a new image replacing video image 105 or shown next to wrist watch 105 in video image 105). Alternatively, or additionally, a transaction may be rendered with respect to a watch identical or similar to wrist watch 148 (e.g., purchase of a watch identical or similar to wrist watch 148 at an online store).

Figure 3:
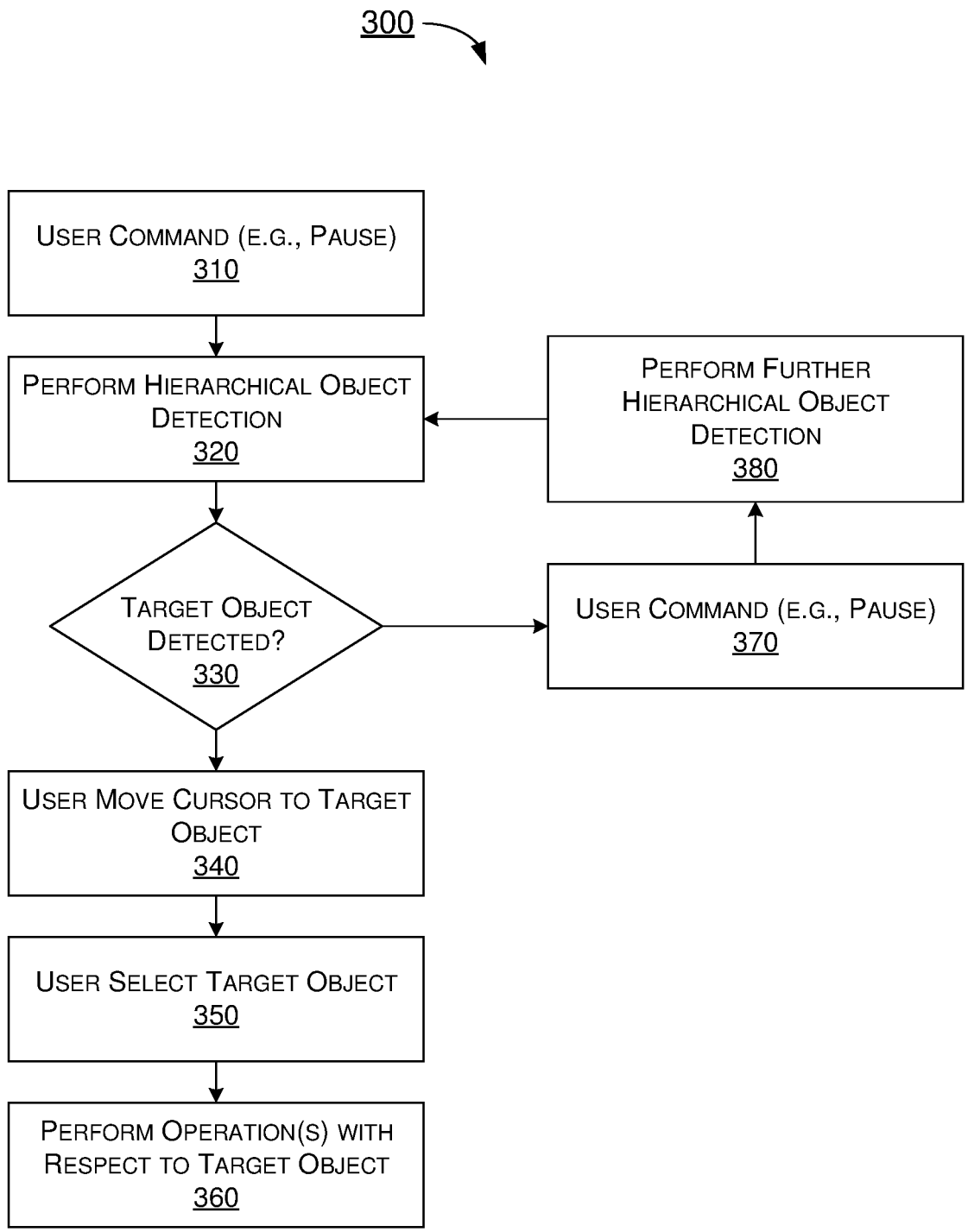
FIG. 3 is an example operational flow in accordance with an implementation of the present disclosure.

FIG. 3 illustrates an example operational flow 300 of an approach for low-complexity detection in accordance with the sixth embodiment of the present disclosure. Operational flow 300 may represent an aspect of implementing the proposed concepts and schemes with respect to a hierarchical approach to detection and selection of objects in an image. Operational flow 300, whether partially or completely, may be implemented in scenario 100 and/or scenario 200. Operational flow 300 may include one or more operations, actions, or functions as illustrated by one or more of blocks 310, 320, 330, 340, 350, 360, 370 and 380. Although illustrated as discrete blocks, various blocks of operational flow 300 may be divided into additional blocks, combined into fewer blocks, or eliminated, depending on the desired implementation. Moreover, the blocks of operational flow 300 may be executed in the order shown in FIG. 3 or, alternatively in a different order. Operational flow 300 may also include additional operations not shown in FIG. 3. One or more of the blocks of operational flow 300 may be executed iteratively. Operational flow 300 may begin at block 310.

At 310, operational flow 300 may involve a user providing a user command. For instance, the user may press a "pause" button on a remote control or an icon representing a "pause" button on a touch panel of a smartphone or display device. Alternatively, the user may use gesture control with a gesture to enter the user command of "pause." Operational flow 300 may proceed from 310 to 320.

At 320, operational flow 300 may involve a process of an apparatus (e.g., an intelligent display such as an intelligent television (TV)) performing hierarchical object detection in accordance with the present disclosure. Operational flow 300 may proceed from 320 to 330.

At 330, operational flow 300 may involve the user determining whether an object of interest (target object) has been detected. Operational flow 300 may proceed from 330 to 340 in an event of a positive determination (e.g., target object detected) or from 330 to 370 in an event of a negative determination (e.g., target object not detected).

At 340, operational flow 300 may involve the user moving a cursor from one of the objects to the target object. For instance, the user may press one or more arrows (e.g., "up", "down", "left" and "right" buttons) on a remote control or one or more icons representing "up", "down", "left" and "right" buttons on a touch panel of a smartphone or display device. Alternatively, the user may touch a location on the touch panel where the target object is displayed to select the target object. Operational flow 300 may proceed from 340 to 390.

At 350, operational flow 300 may involve the user selecting the target object. For instance, the user may press a "select" or "enter" button on a remote control or an icon representing a "select" or "enter" button on a touch panel of a smartphone or display device. Operational flow 300 may proceed from 350 to 360.

At 360, operational flow 300 may involve the processor performing one or more operations with respect to the selected (target) object. For instance, the processor may search up or otherwise obtain information related to the selected object and display the information for viewing by the user. Alternatively, or additionally, the processor may render a transaction with respect to the selected object (e.g., purchasing an object identical or similar to the selected object at an online store).

At 370, operational flow 300 may involve the user providing a user command. For instance, the user may again press a "pause" button on a remote control or an icon representing a "pause" button on a touch panel of a smartphone or display device. Alternatively, the user may use gesture control with a gesture to enter the user command of "pause." Operational flow 300 may proceed from 370 to 380.

At 380, operational flow 300 may involve the processor performing further hierarchical object detection in accordance with the present disclosure. Operational flow 300 may proceed from 380 to 320 to repeat at least some of the above-described operations.

Illustrative Implementations

Figure 4:
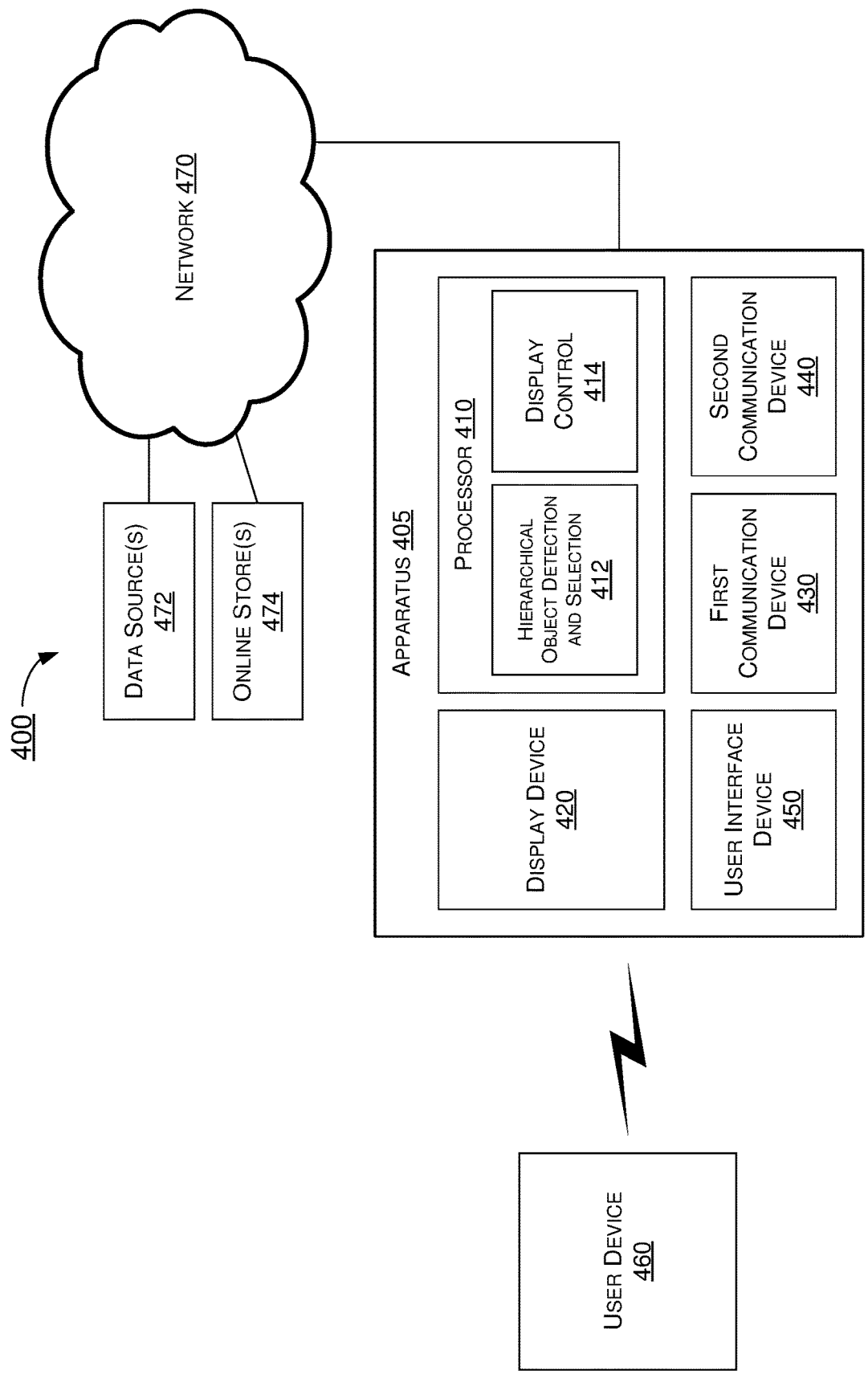
FIG. 4 is a diagram of an example system in accordance with an implementation of the present disclosure.

FIG. 4 illustrates an example system 400 in accordance with an implementation of the present disclosure. System 400 may include an apparatus 405 and a user device 460. Apparatus 405 may perform various functions to implement schemes, techniques, processes and methods described herein pertaining to hierarchical object detection and selection, including those with respect to scenario 100, scenario 200 and operational flow 300 described above as well as process 500 described below.

Apparatus 405 may be a part of an electronic apparatus, which may be an intelligent display apparatus, a portable or mobile apparatus, a wearable apparatus, a wireless communication apparatus or a computing apparatus. For instance, apparatus 405 may be implemented in a smart TV/intelligent TV, a smartphone, a smartwatch, a personal digital assistant, a digital camera, or a computing equipment such as a tablet computer, a laptop computer or a notebook computer. Alternatively, apparatus 405 may be implemented in the form of one or more integrated-circuit (IC) chips such as, for example and without limitation, one or more single-core processors, one or more multi-core processors, or one or more complex-instruction-set-computing (CISC) processors. Apparatus 405 may include at least some of those components shown in FIG. 4 such as a processor 410, for example. Apparatus 405 may further include one or more other components not pertinent to the proposed scheme of the present disclosure (e.g., internal power supply, memory/data storage, and power management), and, thus, such component(s) of apparatus 405 are neither shown in FIG. 4 nor described below in the interest of simplicity and brevity.

In one aspect, processor 410 may be implemented in the form of one or more single-core processors, one or more multi-core processors, or one or more CISC processors. That is, even though a singular term "a processor" is used herein to refer to processor 410, processor 410 may include multiple processors in some implementations and a single processor in other implementations in accordance with the present disclosure. In another aspect, processor 410 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 410 is a special-purpose machine specifically designed, arranged and configured to perform specific tasks including hierarchical object detection and selection in accordance with various implementations of the present disclosure. In some implementations, processor 410 may include a hierarchical object detection and selection module 412 and a display control module 414. In some implementations, each of hierarchical object detection and selection module 412 and display control module 414 may be implemented in hardware such as electronic circuits. Alternatively, each of hierarchical object detection and selection module 412 and display control module 414 may be implemented in software. Still alternatively, each of hierarchical object detection and selection module 412 and display control module 414 may be implemented in both hardware and software.

In some implementations, apparatus 405 may include a display device 420 capable of displaying videos and still images. In some implementations, apparatus 405 may also include a user interface device 450 capable of receiving user inputs. For instance, user interface device 450 may include a touch panel, a keyboard, a keypad, a remote control, an image sensor, a visual sensor, a light sensor, an acoustic sensor, or a combination thereof. In some implementations, apparatus 405 may further include first communication device 430 capable of communicating with user device 460, and first communication device 430 may communicate with user device 460 via wireless and/or wired means. For instance, first communication device 430 may be capable of wireless communication (e.g., transmitting data and receiving user commands) with user device 460 in accordance with one or more wireless protocols, standards, specifications and/or technologies including, for example and without limitation, infrared (IR), Bluetooth, Near-Field Communication (NFC), IEEE 802.11, Zigbee, ultrasound and optical light. In some implementations, apparatus 405 may include additionally include second communication device 440 capable of communicating with one or more data source(s) 472 and one or more online store(s) 474 (e.g., electronic commerce website(s)) via a network 470. Network 470 may include the Internet and one or more other networks such as local area network(s) (LANs), wide area network(s) (WANs), metropolitan area network(s) (MANs) and/or mobile cellular network(s).

In some implementations, display control circuit 414 of processor 410 may play a video on display device 420. Additionally, processor 410 may receive a first command one or more times. For instance, processor 410 may receive the first command from user device 460 via first communication device 430. Alternatively, processor 410 may receive the first command via user interface device 450. For instance, the user may enter the first command by touching a touch panel of user interface device 450. Alternatively, the user may enter the first command by gesture control with a gesture that represents the first command (e.g., a movement of a finger, a hand, or eyes of the user in a pre-defined pattern corresponding to the first command). In response to receiving the first command one or more times, processor 410 may perform object detection in a hierarchical manner with respect to a plurality of objects in the video. For instance, display control circuit 414 may display, on display device 420, a video image from the video. Upon receiving the first command for an $N^{th}$ time, hierarchical object detection and selection circuit 412 of processor 410 may perform the following operations: (1) detecting in the video image a first set of one or more objects of the plurality of objects at a first hierarchical level, with N being a positive integer equal to or greater than 1; and (2) highlighting, on display device 420, the first set of one or more objects. Upon receiving the first command for an $(N+1)^{th}$ time, hierarchical object detection and selection circuit 412 may perform the following operations: (1) detecting in the video image a second set of one or more objects of the plurality of objects at a second hierarchical level below the first hierarchical level; and (2) highlighting, on display device 420, the second set of one or more objects. Each object of the second set of one or more objects may be a part of a respective object of the first set of one or more objects.

In some implementations, the first command may include a command to pause the playing of the video.

In some implementations, in displaying the video image from the video, display control circuit 414 may pause the playing of the video at the video image to display the video image. Alternatively, in displaying the video image from the video, display control circuit 414 may continue the playing of the video on display device 420 and display the video image as a picture-in-picture (PIP) at a portion of display device 420.

In some implementations, in highlighting the first set of one or more objects, hierarchical object detection and selection circuit 412 may display a respective box, circle or ellipse around each object of the first set of one or more objects. Additionally, in highlighting the second set of one or more objects, hierarchical object detection and selection circuit 412 of may display a respective box, circle or ellipse around each object of the second set of one or more objects.

In some implementations, in highlighting the first set of one or more objects, hierarchical object detection and selection circuit 412 of may highlight a first object of the first set of one or more objects in a first fashion. Additionally, hierarchical object detection and selection circuit 412 of may highlight at least another object of the first set of one or more objects in a second fashion different from the first fashion. For instance, hierarchical object detection and selection circuit 412 of may highlight the first object with a first color, style and/or brightness, and highlighting at least another object of the first set of one or more objects with a second color, style and/or brightness different from the first color, style and/or brightness.

In some implementations, in highlighting the second set of one or more objects, hierarchical object detection and selection circuit 412 of may highlight a second object of the second set of one or more objects in a third fashion. Moreover, hierarchical object detection and selection circuit 412 of may highlight at least another object of the second set of one or more objects in a fourth fashion different from the third fashion. Furthermore, hierarchical object detection and selection circuit 412 of may remove the highlighting of at least one object of the first set of one or more objects. For instance, hierarchical object detection and selection circuit 412 of may highlight the second object with a third color, style and/or brightness, and highlighting at least another object of the second set of one or more objects with a fourth color, style and/or brightness different from the third color, style and/or brightness. The third color, style and/or brightness may be the same as either the first color, style and/or brightness or the second color, style and/or brightness. Alternatively, the third color, style and/or brightness may be different from the first color, style and/or brightness and the second color, style and/or brightness. Similarly, the fourth color, style and/or brightness may be the same as either the first color, style and/or brightness or the second color, style and/or brightness. Moreover, the fourth color, style and/or brightness may be different from the first color, style and/or brightness and the second color, style and/or brightness.

In some implementations, processor 410 may be further capable of performing additional operations. For instance, processor 410 may receive a second command. The second command may be, for example and without limitation, a "move" command to move a cursor as displayed on display device 420 or a touch on a touch panel received from user device 460 or user interface device 450. Alternatively, the second command may be a gesture control by the user using a gesture (e.g., using a finger, a hand or eyes of the user). In response to receiving the second command, processor 410 may perform either of the following: (1) upon receiving the second command after receiving the first command for the Nth time and before the $(N+1)^{th}$ time, altering the highlighting of the first set of one or more objects such that the first object is highlighted in the second fashion and a third object of the first set of one or more objects is highlighted in the first fashion; or (2) upon receiving the second command after receiving the first command for the $(N+1)^{th}$ time, altering the highlighting of the second set of one or more objects such that the second object is highlighted in the fourth fashion and a fourth object of the second set of one or more objects is highlighted in the third fashion.

In some implementations, the second command may include a command indicating a direction of movement of selection.

In some implementations, the direction may indicate a general direction from a location of the first object as displayed on display device 420 to a location of the third object as displayed on display device 420 or a general direction from a location of the second object as displayed on display device 420 to a location of the fourth object as displayed on display device 420.

In some implementations, processor 410 may be additionally capable of performing other operations. For instance, processor 410 may receive a third command indicating selection of an object of the first set of one or more objects or the second set of one or more objects. The third command may be, for example and without limitation, a "select" or "enter" command to select a target object among the highlighted objects as displayed on display device 420, a touch on a touch panel received from user device 460 or user interface device 450, or gesture control by the user with a gesture that corresponds to the "move" command as sensed by user interface device 450. Additionally, processor 410 may perform an operation with respect to the selected object.

In some implementations, in performing the operation with respect to the selected object, processor 410 may perform one or more of the following: (1) searching for information related to the selected object; (2) displaying, on display device 420, the information related to the selected object; and (3) rendering a transaction with respect to the selected object. For instance, processor 410 may search or otherwise obtain information related to the selected object, via second communication device 440, from data source(s) 472 (e.g., one or more websites and/or search engines). Additionally, processor 410 may display the information related to the selected object on display device 420 for viewing by the user. Moreover, the transaction may involve processor 410 purchasing an object identical or similar to the selected object at online store 474.

Illustrative Processes

Figure 5:
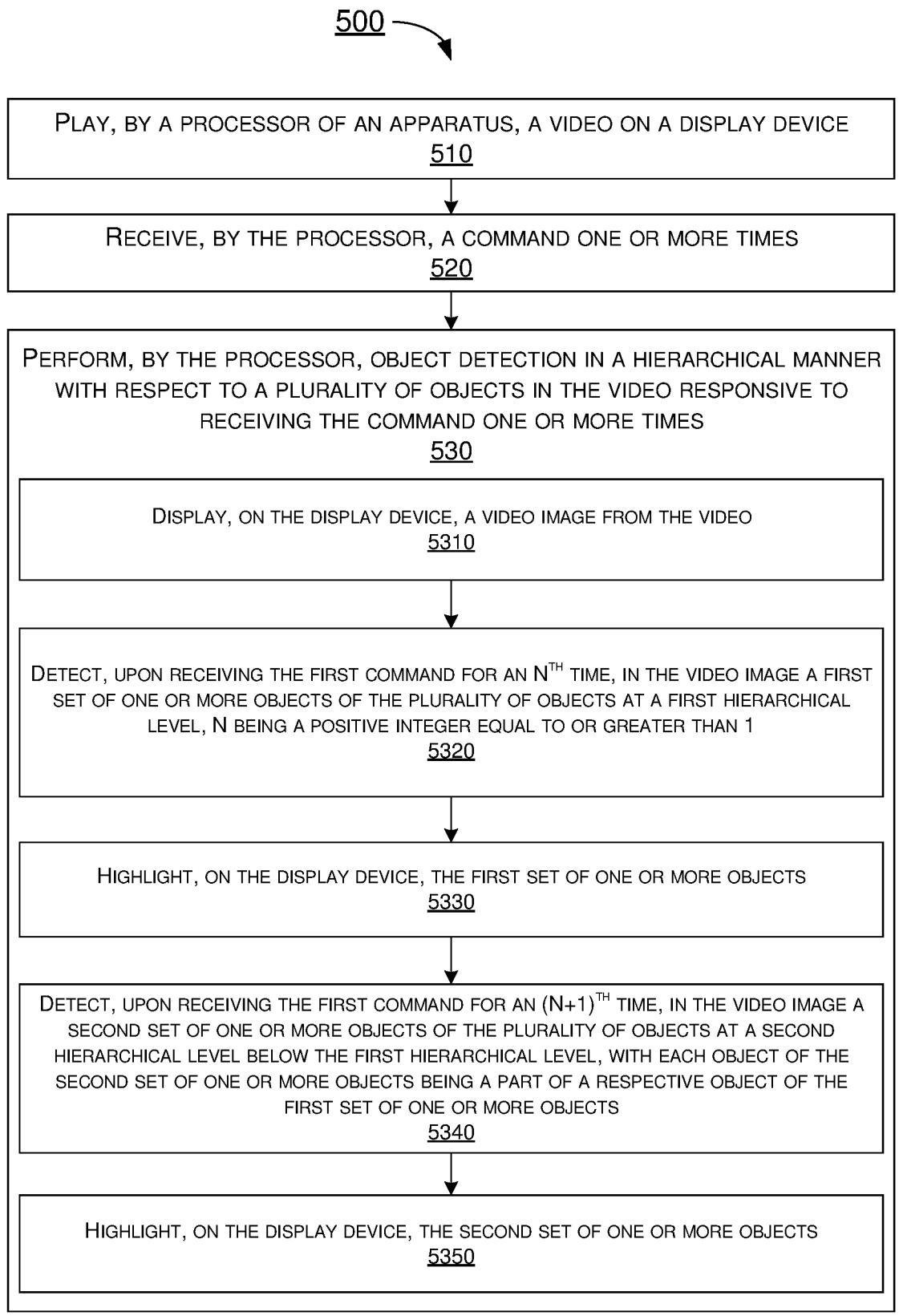
FIG. 5 is a flowchart of a process in accordance with an implementation of the present disclosure.

FIG. 5 illustrates an example process 500 in accordance with an implementation of the present disclosure. Process 500 may represent an aspect of implementing the proposed concepts and schemes such as one or more of the various schemes, concepts, embodiments and examples described above with respect to FIG. 1~FIG. 4. More specifically, process 500 may represent an aspect of the proposed concepts and schemes pertaining to using even-length sequence for synchronization and device identification in wireless communications. For instance, process 500 may be an example implementation, whether partially or completely, of the proposed schemes, concepts and examples described above from a RX perspective for using even-length sequence for synchronization and device identification in wireless communications. Process 500 may include one or more operations, actions, or functions as illustrated by one or more of blocks 510, 520 and 530 as well as sub-blocks 5310, 5320, 5330, 5340 and 5350. Although illustrated as discrete blocks, various blocks of process 500 may be divided into additional blocks, combined into fewer blocks, or eliminated, depending on the desired implementation. Process 500 may also include additional operations and/or acts not shown in FIG. 5. Moreover, the blocks of process 500 may be executed in the order shown in FIG. 5 or, alternatively in a different order. The blocks of process 500 may be executed iteratively. Process 500 may be implemented by or in apparatus 405 as well as any variations thereof. Solely for illustrative purposes and without limiting the scope, process 500 is described below with reference to apparatus 405. Process 500 may begin at block 510.

At 510, process 500 may involve processor 410 of apparatus 405 playing a video on display device 420. Process 500 may proceed from 510 to 520.

At 520, process 500 may involve processor 410 receiving a first command one or more times. For example, processor 410 may receive the first command from user device 460 via first communication device 430. Alternatively, processor 410 may receive the first command via user interface device 450. The first command may be, for example and without limitation, a "pause" command received from user device 460 (e.g., a smartphone or a remote control) or gesture control by a user with a gesture that corresponds to the "pause" command. Process 500 may proceed from 520 to 530.

At 530, process 500 may involve processor 410 performing object detection in a hierarchical manner with respect to a plurality of objects in the video responsive to receiving the first command one or more times. Specifically, process 500 may involve processor 410 performing a number of operations as represented by sub-blocks 5310~5350.

At 5310, process 500 may involve processor 410 displaying, on display device 420, a video image from the video. Process 500 may proceed from 5310 to 5320.

At 5320, process 500 may involve processor 410 detecting, upon receiving the first command for an $N^{th}$ time, in the video image a first set of one or more objects of the plurality of objects at a first hierarchical level, with N being a positive integer equal to or greater than 1. Process 500 may proceed from 5320 to 5330.

At 5330, process 500 may involve processor 410 highlighting, on display device 420, the first set of one or more objects. Process 500 may proceed from 5330 to 5340.

At 5340, process 500 may involve processor 410 detecting, upon receiving the first command for an $(N+1)^{th}$ time, in the video image a second set of one or more objects of the plurality of objects at a second hierarchical level below the first hierarchical level. Each object of the second set of one or more objects may be a part of a respective object of the first set of one or more objects. Process 500 may proceed from 5340 to 5350.

At 5350, process 500 may involve processor 410 highlighting, on display device 420, the second set of one or more objects.

In some implementations, the first command may include a command to pause the playing of the video.

In some implementations, in displaying the video image from the video, process 500 may involve processor 410 pausing the playing of the video at the video image to display the video image. Alternatively, in displaying the video image from the video, process 500 may involve processor 410 continuing the playing of the video on display device 420 and displaying the video image as a picture-in-picture (PIP) at a portion of display device 420.

In some implementations, in highlighting the first set of one or more objects, process 500 may involve processor 410 displaying a respective box, circle or ellipse around each object of the first set of one or more objects. Additionally, in highlighting the second set of one or more objects, process 500 may involve processor 410 displaying a respective box, circle or ellipse around each object of the second set of one or more objects.

In some implementations, in highlighting the first set of one or more objects, process 500 may involve processor 410 highlighting a first object of the first set of one or more objects in a first fashion. Additionally, process 500 may involve processor 410 highlighting at least another object of the first set of one or more objects in a second fashion different from the first fashion. For instance, process 500 may involve processor 410 highlighting the first object with a first color, style and/or brightness, and highlighting at least another object of the first set of one or more objects with a second color, style and/or brightness different from the first color, style and/or brightness.

In some implementations, in highlighting the second set of one or more objects, process 500 may involve processor 410 highlighting a second object of the second set of one or more objects in a third fashion. Moreover, process 500 may involve processor 410 highlighting at least another object of the second set of one or more objects in a fourth fashion different from the third fashion. Furthermore, process 500 may involve processor 410 removing the highlighting of at least one object of the first set of one or more objects. For instance, process 500 may involve processor 410 highlighting the second object with a third color, style and/or brightness, and highlighting at least another object of the second set of one or more objects with a fourth color, style and/or brightness different from the third color, style and/or brightness. The third color, style and/or brightness may be the same as either the first color, style and/or brightness or the second color, style and/or brightness. Alternatively, the third color, style and/or brightness may be different from the first color, style and/or brightness and the second color, style and/or brightness. Similarly, the fourth color, style and/or brightness may be the same as either the first color, style and/or brightness or the second color, style and/or brightness. Moreover, the fourth color, style and/or brightness may be different from the first color, style and/or brightness and the second color, style and/or brightness.

In some implementations, process 500 may involve processor 410 performing additional operations. For instance, process 500 may involve processor 410 receiving a second command. The second command may be, for example and without limitation, a "move" command to move a cursor as displayed on display device 420, a touch on a touch panel received from user device 460 or user interface device 450, or gesture control by the user with a gesture that corresponds to the "move" command. In response to receiving the second command, process 500 may involve processor 410 performing either of the following: (1) upon receiving the second command after receiving the first command for the Nth time and before the $(N+1)^{th}$ time, altering the highlighting of the first set of one or more objects such that the first object is highlighted in the second fashion and a third object of the first set of one or more objects is highlighted in the first fashion; or (2) upon receiving the second command after receiving the first command for the $(N+1)^{th}$ time, altering the highlighting of the second set of one or more objects such that the second object is highlighted in the fourth fashion and a fourth object of the second set of one or more objects is highlighted in the third fashion.

In some implementations, the second command may include a command indicating a direction of movement of selection.

In some implementations, the direction may indicate a general direction from a location of the first object as displayed on display device 420 to a location of the third object as displayed on display device 420 or a general direction from a location of the second object as displayed on display device 420 to a location of the fourth object as displayed on display device 420.

In some implementations, process 500 may involve processor 410 performing additional operations. For instance, process 500 may involve processor 410 receiving a third command indicating selection of an object of the first set of one or more objects or the second set of one or more objects. The third command may be, for example and without limitation, a "select" or "enter" command to select a target object among the highlighted objects as displayed on display device 420, a touch on a touch panel received from user device 460 or user interface device 450, or gesture control by the user with a gesture that corresponds to the "select" or "enter" command as sensed by user interface device 450. Additionally, process 500 may involve processor 410 performing an operation with respect to the selected object.

In some implementations, in performing the operation with respect to the selected object, process 500 may involve processor 410 performing one or more of the following: (1) searching for information related to the selected object; (2) displaying, on display device 420, the information related to the selected object; and (3) rendering a transaction with respect to the selected object. For instance, process 500 may involve processor 410 searching or otherwise obtaining information related to the selected object, via second communication device 440, from data source(s) 472 (e.g., one or more websites and/or search engines). Additionally, process 500 may involve processor 410 displaying the information related to the selected object on display device 420 for viewing by the user. Moreover, for the transaction, process 500 may involve processor 410 purchasing an object identical or similar to the selected object at online store 474.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   playing, by a processor of an apparatus, a video on a display device;
   receiving, by the processor, a first command one or more times;
   performing, by the processor, object detection in a hierarchical manner with respect to a plurality of objects in the video responsive to receiving the first command one or more times;
   receiving, by the processor, a second command indicating selection of an object of a first set of one or more objects or a second set of one or more objects in the video; and
   performing, by the processor, an operation with respect to the selected object,
   wherein the performing of the object detection in the hierarchical manner with respect to the plurality of objects in the video comprises:
   displaying, on the display device, a video image from the video;
   detecting, upon receiving the first command for an Nth time, in the video image the first set of one or more objects of the plurality of objects at a first hierarchical level, N being a positive integer equal to or greater than 1;
   highlighting, on the display device, the first set of one or more objects;
   detecting, upon receiving the first command for an $(N+1)^{th}$ time, in the video image the second set of one or more objects of the plurality of objects at a second hierarchical level below the first hierarchical level; and
   highlighting, on the display device, the second set of one or more objects,
   wherein each object of the second set of one or more objects is a part of a respective object of the first set of one or more objects.

2. The method of claim 1, wherein the first command comprises either or both of a gesture control and a command to pause the playing of the video, wherein, responsive to the first command comprising the gesture control, the gesture control comprises a gesture of a user detected by the processor, and wherein the displaying of the video image from the video comprises pausing the playing of the video at the video image.

3. The method of claim 1, wherein the displaying of the video image from the video comprises:
   continuing the playing of the video on the display device; and
   displaying the video image as a picture-in-picture (PIP) at a portion of the display device.

4. The method of claim 1, wherein the highlighting of the first set of one or more objects comprises displaying a respective box, circle or ellipse around each object of the first set of one or more objects, and wherein the highlighting of the second set of one or more objects comprises displaying a respective box, circle or eclipse around each object of the second set of one or more objects.

5. The method of claim 1, wherein:
   the highlighting of the first set of one or more objects comprises:
      highlighting a first object of the first set of one or more objects in a first fashion; and
      highlighting at least another object of the first set of one or more objects in a second fashion different from the first fashion, and
   the highlighting of the second set of one or more objects comprises:
      highlighting a second object of the second set of one or more objects in a third fashion;

highlighting at least another object of the second set of one or more objects in a fourth fashion different from the third fashion; and removing the highlighting of at least one object of the first set of one or more objects.

6. The method of claim 5, further comprising:

receiving, by the processor, a third command; and responsive to receiving the third command, performing, by the processor, either:

upon receiving the third command after receiving the first command for the $N^{th}$ time and before the $(N+1)^{th}$ time, altering the highlighting of the first set of one or more objects such that the first object is highlighted in the second fashion and a third object of the first set of one or more objects is highlighted in the first fashion; or upon receiving the third command after receiving the first command for the $(N+1)^{th}$ time, altering the highlighting of the second set of one or more objects such that the second object is highlighted in the fourth fashion and a fourth object of the second set of one or more objects is highlighted in the third fashion.

7. The method of claim 6, wherein the third command comprises a command indicating a direction of movement of selection.

8. The method of claim 7, wherein the direction indicates a general direction from a location of the first object as displayed on the display device to a location of the third object as displayed on the display device or a general direction from a location of the second object as displayed on the display device to a location of the fourth object as displayed on the display device.

9. The method of claim 1, wherein the performing of the operation with respect to the selected object comprises performing one or more of:

searching for information related to the selected object;

displaying, on the display device, the information related to the selected object; and rendering a transaction with respect to the selected object.

10. An apparatus, comprising:

a display device; and a processor communicatively coupled to the display device, the processor configured to perform operations comprising:

playing a video on the display device;

receiving a first command one or more times;

performing object detection in a hierarchical manner with respect to a plurality of objects in the video responsive to receiving the first command one or more times;

receiving a second command indicating selection of an object of a first set of one or more objects or a second set of one or more objects in the video; and performing an operation with respect to the selected object by performing one or more of:

searching for information related to the selected object;

displaying, on the display device, the information related to the selected object; and rendering a transaction with respect to the selected object, wherein, in performing the object detection in the hierarchical manner with respect to the plurality of objects in the video, the processor performs operations comprising:

displaying, on the display device, a video image from the video;

detecting, upon receiving the first command for an Nth time, in the video image the first set of one or more objects of the plurality of objects at a first hierarchical level, N being a positive integer equal to or greater than 1;

highlighting, on the display device, the first set of one or more objects;

detecting, upon receiving the first command for an (N+1)th time, in the video image the second set of one or more objects of the plurality of objects at a second hierarchical level below the first hierarchical level; and highlighting, on the display device, the second set of one or more objects, wherein each object of the second set of one or more objects is a part of a respective object of the first set of one or more objects.

11. The apparatus of claim 10, wherein the first command comprises either or both of a gesture control and a command to pause the playing of the video, wherein, responsive to the first command comprising the gesture control, the gesture control comprises a gesture of a user detected by the processor, and wherein, in displaying the video image from the video, the processor pauses the playing of the video at the video image.

12. The apparatus of claim 10, wherein, in displaying the video image from the video, the processor performs operations comprising:

continuing the playing of the video on the display device; and displaying the video image as a picture-in-picture (PIP) at a portion of the display device.

13. The apparatus of claim 10, wherein, in highlighting the first set of one or more objects, the processor displays a respective box, circle or ellipse around each object of the first set of one or more objects, and wherein, in highlighting the second set of one or more objects, the processor displays a respective box, circle or eclipse around each object of the second set of one or more objects.

14. The apparatus of claim 10, wherein:

in highlighting the first set of one or more objects, the processor performs operations comprising:

highlighting a first object of the first set of one or more objects in a first fashion; and highlighting at least another object of the first set of one or more objects in a second fashion different from the first fashion, and in highlighting the second set of one or more objects, the processor performs operations comprising:

highlighting a second object of the second set of one or more objects in a third fashion;

highlighting at least another object of the second set of one or more objects in a fourth fashion different from the third fashion; and removing the highlighting of at least one object of the first set of one or more objects.

15. The apparatus of claim 14, wherein the processor is further configured to perform operations comprising:

receiving a third command; and responsive to receiving the third command, performing either:

upon receiving the third command after receiving the first command for the $N^{th}$ time and before the $(N+1)^{th}$ time, altering the highlighting of the first set of one or more objects such that the first object is highlighted in the second fashion and a third object of the first set of one or more objects is highlighted in the first fashion; or upon receiving the third command after receiving the first command for the $(N+1)^{th}$ time, altering the highlighting of the second set of one or more objects such that the second object is highlighted in the fourth fashion and a fourth object of the second set of one or more objects is highlighted in the third fashion.

16. The apparatus of claim 15, wherein the third command comprises a command indicating a direction of movement of selection, and wherein the direction indicates a general direction from a location of the first object as displayed on the display device to a location of the third object as displayed on the display device or a general direction from a location of the second object as displayed on the display device to a location of the fourth object as displayed on the display device.

\* \* \* \* \*